United States Patent
Consiglieri Pedroso Mendes Dias et al.

(10) Patent No.: US 12,547,181 B2
(45) Date of Patent: Feb. 10, 2026

(54) METHOD AND SYSTEM FOR GENERATING A LATERAL TRAJECTORY OF AN AIRCRAFT

(71) Applicant: Airbus SAS, Blagnac (FR)

(72) Inventors: Miguel Consiglieri Pedroso Mendes Dias, Blagnac (FR); Thomas Pastre, Blagnac (FR)

(73) Assignee: Airbus SAS, Blagnac (FR)

( * ) Notice: Subject to any disclaimer, the term of this patent is extended or adjusted under 35 U.S.C. 154(b) by 222 days.

(21) Appl. No.: 18/352,442

(22) Filed: Jul. 14, 2023

(65) Prior Publication Data

US 2024/0019875 A1 Jan. 18, 2024

(30) Foreign Application Priority Data

Jul. 18, 2022 (FR) ..................................... 2207343

(51) Int. Cl.
*G05D 1/00* (2024.01)
*G08G 5/80* (2025.01)

(52) U.S. Cl.
CPC ............ *G05D 1/101* (2013.01); *G05D 1/0088* (2013.01); *G08G 5/80* (2025.01)

(58) Field of Classification Search
CPC ........ G05D 1/101; G05D 1/0088; G08G 5/80; G08G 5/21; G08G 5/59; G08G 5/76; G08G 5/32; G08G 5/53; G08G 5/55; G01C 21/20
USPC .......................................................... 701/3
See application file for complete search history.

(56) References Cited

U.S. PATENT DOCUMENTS

| | | | | |
|---|---|---|---|---|
| 6,426,889 B2* | 7/2002 | Sekiguchi | ........... | G11C 11/4097 365/230.03 |
| 7,194,353 B1 | 3/2007 | Baldwin et al. | | |
| 10,352,711 B2* | 7/2019 | Diaz | .................. | G01C 21/3415 |
| 10,860,115 B1* | 12/2020 | Tran | ...................... | G06F 3/0346 |
| 11,262,764 B2* | 3/2022 | Navarro | ................. | G01C 21/20 |
| 12,025,987 B2* | 7/2024 | Kolling | ................. | G05D 1/648 |
| 2006/0235581 A1* | 10/2006 | Petillon | .................... | G08G 5/80 701/3 |
| 2008/0306680 A1 | 12/2008 | Marty et al. | | |

(Continued)

FOREIGN PATENT DOCUMENTS

EP 3770555 B1 10/2021

OTHER PUBLICATIONS

French Search Report for corresponding French Patent Application No. 2207343 dated Feb. 28, 2023; priority document.

*Primary Examiner* — Tuan C To
*Assistant Examiner* — Dominick Mulder
(74) *Attorney, Agent, or Firm* — Greer, Burns & Crain, Ltd.

(57) ABSTRACT

To bring an aircraft in flight from an initial position to a destination, an automatic trajectory generation system: obtains polygons representative of obstacles potentially encountered by the aircraft; and searches for a lateral trajectory that is flyable by performing circumventions of polygons by their vertices, by observing a pre-established vertical trajectory profile. The lateral trajectory being sought by discovering the polygons to be effectively taken into account to perform the circumventions, by gradually identifying the polygons which form obstacles to the progress of the flyable lateral trajectory. Thus, the quantity of polygons to be taken into account in searching for the flyable lateral trajectory is reduced.

10 Claims, 10 Drawing Sheets

(56) References Cited

U.S. PATENT DOCUMENTS

| | | | |
|---|---|---|---|
| 2015/0226575 A1* | 8/2015 | Rambo | G08G 5/57 |
| | | | 701/523 |
| 2015/0279218 A1* | 10/2015 | Irrgang | G08G 5/58 |
| | | | 701/3 |
| 2016/0284221 A1* | 9/2016 | Hinkle | G01C 21/20 |
| 2017/0116863 A1* | 4/2017 | Valls Hernández | G08G 5/59 |
| 2019/0108680 A1* | 4/2019 | Querejeta Masaveu | |
| | | | G08G 5/59 |
| 2021/0025716 A1 | 1/2021 | Gigomas et al. | |
| 2021/0089055 A1* | 3/2021 | Tran | G08G 5/55 |
| 2022/0189313 A1 | 6/2022 | Allen | |
| 2023/0245575 A1* | 8/2023 | Osipychev | G08G 5/25 |
| | | | 701/3 |

* cited by examiner

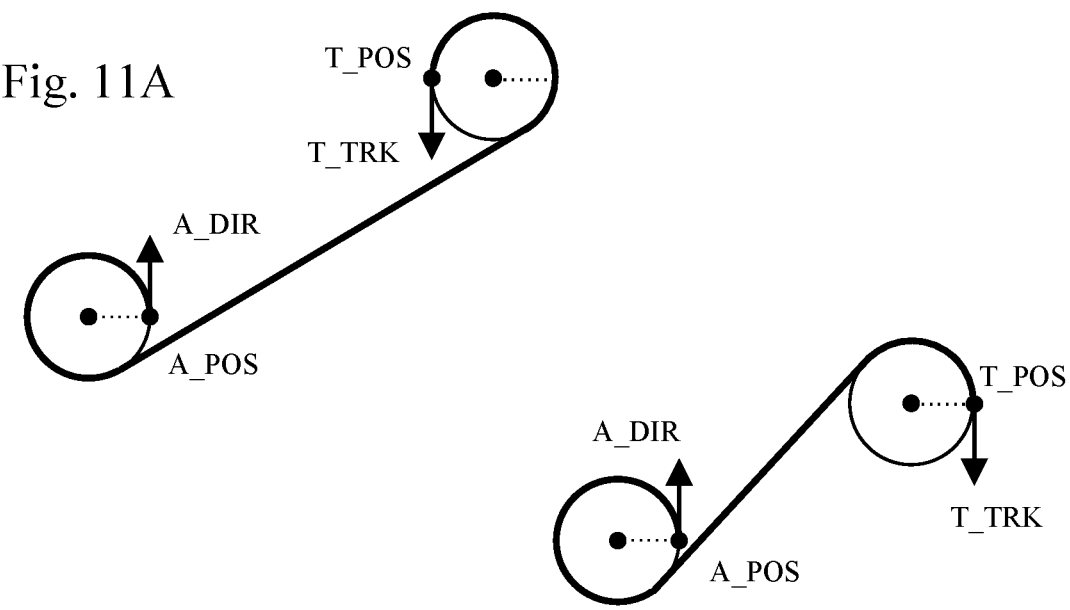
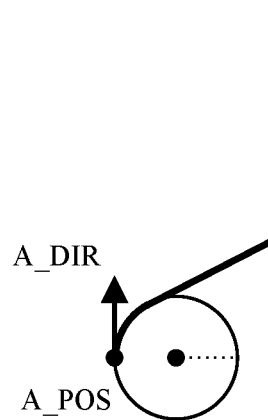
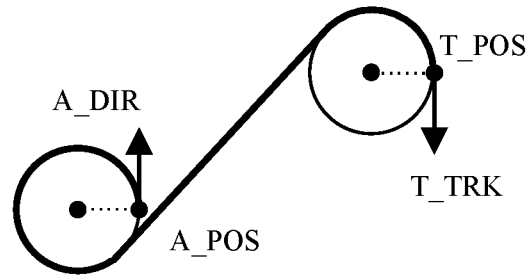
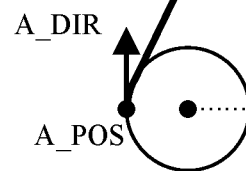
Fig. 11A
Fig. 11B
Fig. 11C
Fig. 11D

METHOD AND SYSTEM FOR GENERATING A LATERAL TRAJECTORY OF AN AIRCRAFT

CROSS-REFERENCES TO RELATED APPLICATIONS

This application claims the benefit of the French patent application No. 2207343 filed on Jul. 18, 2022, the entire disclosures of which are incorporated herein by way of reference.

FIELD OF THE INVENTION

The present invention relates to a system for the automatic generation in real time of a trajectory to be followed to have an aircraft travel according to a vertical trajectory profile to be observed, from a current geographic position in flight, to a georeferenced destination.

BACKGROUND OF THE INVENTION

When an aircraft is in flight, it may be desirable to provide automatic assistance to automatically determine a trajectory which makes it possible to bring the aircraft to a georeferenced position. Many obstacles must be taken into account in the determination of a trajectory which is flyable: the relief of the terrain, the meteorological obstacles, the military zones for which overflight is prohibited, the operational state of the aircraft (cabin depressurization, engine out of service, etc.). A flyable trajectory is a trajectory which, at any point, exhibits a minimal (or predetermined) distance margin with respect to any identified obstacle (relief, etc.) and that the aircraft can follow given its operational state (possible depressurization, loss of an engine, etc.). It is notably desirable to provide such automatic assistance in the context of drone piloting.

In the current state of the art, determining automatically, in real time, such a trajectory requires great processing resources, and above all significant computation time. It is then desirable to mitigate these drawbacks of the state of the art.

It is notably desirable to provide a solution that makes it possible to determine a safe trajectory to be followed to bring an aircraft currently in flight, from its current geographic position to a georeferenced destination by observing a pre-established vertical trajectory profile. It is more particularly desirable to provide a solution which makes it possible to determine this trajectory in a shorter time. It is also desirable to provide a solution which makes it possible to indicate if such a trajectory exists.

SUMMARY OF THE INVENTION

Proposed is a trajectory generation method for bringing an aircraft in flight from an initial position of the aircraft to a destination having a georeferenced position, the method being implemented by an automatic trajectory generation system in the form of electronic circuitry embedded in the aircraft, the method comprising the following steps: obtaining polygons representative of obstacles potentially encountered by the aircraft from the initial position of the aircraft to the destination, each polygon being associated with an altitude layer in which the obstacle is included in the polygon; searching for a lateral trajectory that is flyable between the initial position of the aircraft and the destination by circumventing the polygons by the vertices, by observing a pre-established vertical trajectory profile. The method is such that the lateral trajectory is sought as follows: evaluating first trajectories, which are direct trajectories between a current position of the aircraft and the destination by taking account of a direction of flight of the aircraft at the current position and of a direction to be followed to destination, the current position of the aircraft being initially the initial position of the aircraft, and identifying any polygon encountered in the first trajectories; evaluating a second trajectory, which is a vertex-circumventing trajectory, between the current position of the aircraft and each identified polygon vertex; identifying any new polygon encountered in the second trajectories; choosing a new current position of the aircraft from among the identified polygon vertices for each of which a direct flyable trajectory to a vertex concerned exists, and reiterating until a current position of the aircraft is found for which at least one the first trajectory exists without encountering any polygon. Furthermore, the lateral trajectory is sought in such a way that, when a new polygon is identified, one second trajectory is evaluated for each vertex of each new identified polygon, and this, with respect to each preceding current position, with possible identification of a new polygon encountered.

Thus, a safe trajectory to be followed to bring an aircraft currently in flight, from its current geographic position to a georeferenced destination by observing a pre-established vertical trajectory profile is found, if it exists, and within a shorter time.

In a particular embodiment, the lateral trajectory is sought, by iterations on successive current positions of the aircraft, for: a first phase investigating the direct trajectory between the current position of the aircraft which has been selected for the iteration concerned and the destination, and investigating the possible circumventions of vertices from the current position of the aircraft which has been selected for the iteration concerned; a second phase investigating possible vertex circumventions for the polygons identified during the iteration concerned, from each preceding current position.

In a particular embodiment, when a polygon is newly encountered, each of its vertices for which a direct flyable trajectory to this vertex exists is marked as an open position, and, in the first phase, the current position which has been selected for the iteration concerned is marked as closed position, and in the second phase, the positions marked as closed are the preceding current positions.

In a particular embodiment, the new current position is chosen from among the positions marked as open.

In a particular embodiment, each identified polygon vertex for which a direct flyable trajectory to this vertex exists is associated with a heuristic, or with a cost of inclusion of the circumvention of the vertex in the lateral trajectory to the destination, in order to choose the new current position from among the identified polygon vertices.

In a particular embodiment, the method further comprises the following successive steps, before searching for the lateral trajectory: expanding the polygons by a predetermined lateral margin in all directions, the predetermined lateral margin making it possible to ensure safe instrument navigation of the aircraft; merging the polygons which touch or overlap for each altitude layer; retracting the polygons by the predetermined lateral margin in all directions.

In a particular embodiment, the method comprises the following step, before searching for the lateral trajectory: keeping only the polygons of the layers which are relevant in light of a constant altitude or of an altitude interval defined by the vertical trajectory profile.

Also proposed is a computer program product comprising instructions causing the implementation of the above method according to any one of its embodiments, when the instructions are executed by a processor. Also proposed is a "non-transient" information storage medium storing such a computer program product.

Also proposed is an automatic trajectory generation system for bringing an aircraft in flight from an initial position of the aircraft to a destination having a georeferenced position, the automatic trajectory generation system comprising electronic circuitry which is intended to be embedded in the aircraft and which is configured to implement the following steps: obtaining polygons representative of obstacles potentially encountered by the aircraft from the initial position of the aircraft to the destination, each polygon being associated with an altitude layer in which the obstacle is included in the polygon; searching for a lateral trajectory that is flyable between the initial position of the aircraft and the destination by circumventing the polygons by the vertices, by observing a pre-established vertical trajectory profile. The electronic circuit is configured in such a way that the lateral trajectory is sought as follows: evaluating first trajectories, which are direct trajectories between a current position of the aircraft and the destination by taking account of a direction of flight of the aircraft at the current position and of a direction to be followed to destination, the current position of the aircraft being initially the initial position of the aircraft, and identifying any polygon encountered in the first trajectories; evaluating a second trajectory, which is a vertex-circumventing trajectory, between the current position of the aircraft and each identified polygon vertex; identifying any new polygon encountered in the second trajectories; choosing a new current position of the aircraft from among the identified polygon vertices for each of which a direct flyable trajectory to the vertex concerned exists, and reiterating until a current position of the aircraft is found for which at least one first trajectory exists without encountering a polygon. Furthermore, the electronic circuitry is configured in such a way that the lateral trajectory is further sought in such a way that, when a new polygon is identified, one second trajectory is evaluated for each vertex of each new identified polygon, and this is done, with respect to each preceding current position, with possible identification of a new encountered polygon.

Also proposed is an aircraft comprising such an automatic trajectory generation system.

BRIEF DESCRIPTION OF THE DRAWINGS

The features of the invention mentioned above, and others, will become more clearly apparent on reading the following description of at least one exemplary embodiment, the description being given in relation to the attached drawings, in which:

FIG. 11A schematically illustrates a first trajectory pattern between a current position of the aircraft and a destination to be reached;

FIG. 11B schematically illustrates a second possible trajectory pattern between a current position of the aircraft and a destination to be reached;

FIG. 11C schematically illustrates a third possible trajectory pattern between a current position of the aircraft and a destination to be reached;

FIG. 11D schematically illustrates a fourth possible trajectory pattern between a current position of the aircraft and a destination to be reached;

DETAILED DESCRIPTION OF THE PREFERRED EMBODIMENTS

Figure 1:
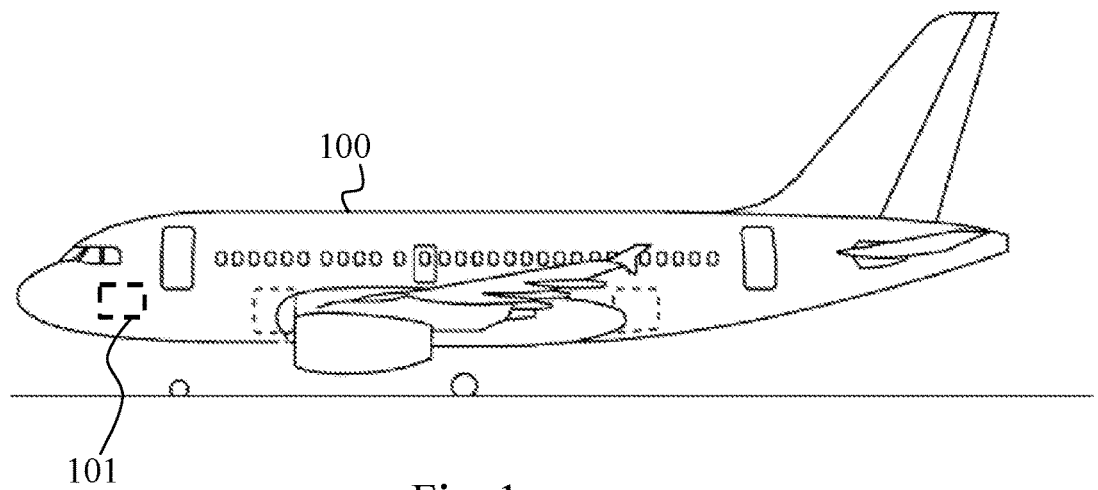
FIG. 1 schematically illustrates, in a side view, an aircraft equipped with an automatic trajectory generation system.

FIG. 1 schematically illustrates, in a side view, an aircraft 100 equipped with an automatic trajectory generation system ATG ("Automatic Trajectory Generator") 101.

The ATG system 101 is an embedded electronic piece of equipment. For example, the ATG system 101 forms part of an electronic circuitry of the avionics of the aircraft 100. Preferentially, the ATG system 101 is incorporated in a computer of the aircraft 100, for example the flight management system FMS of the aircraft 100 or another trajectory computation system distinct from the flight management system FMS.

The ATG system 101 is a piloting assistance system for determining in real time, a safe and flyable trajectory to be followed to bring the aircraft 100 when the latter is in flight, from its current geographic position to a georeferenced destination, such as, for example, an airport or a current position of an aircraft carrier.

Figure 2:
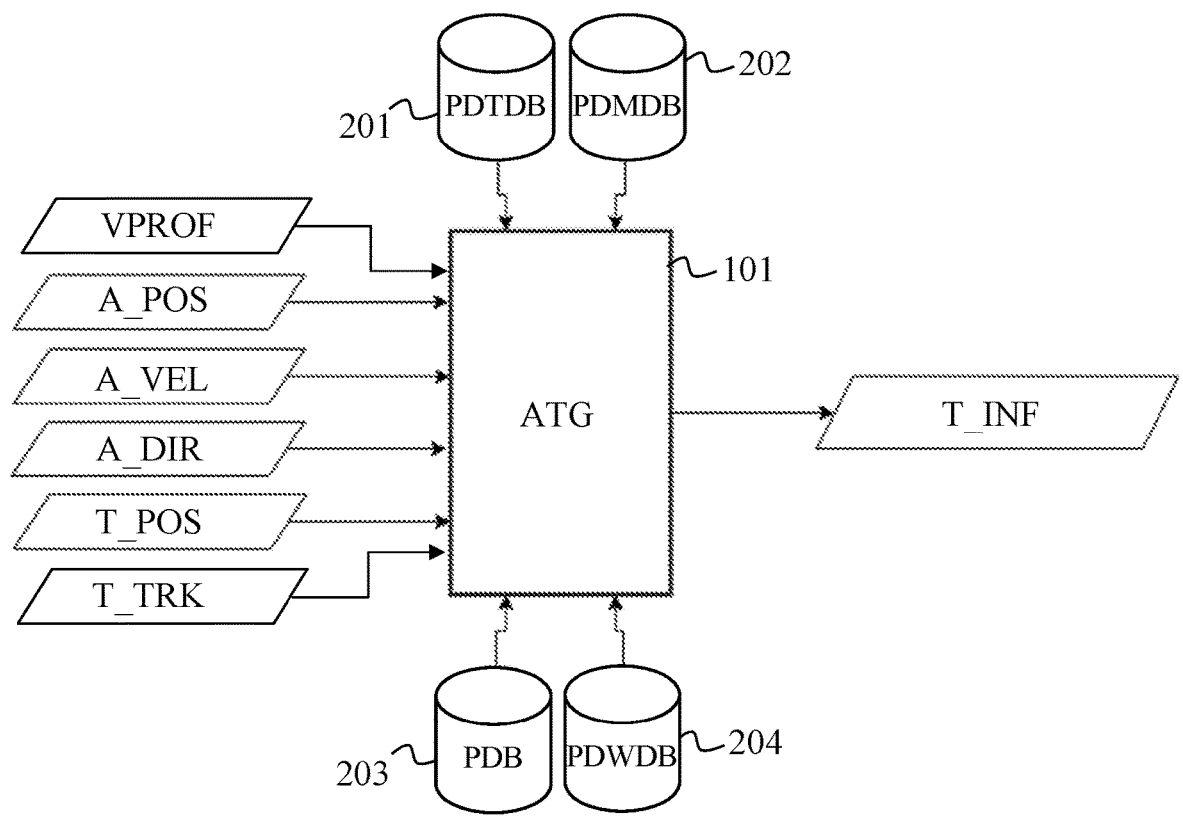
FIG. 2 schematically illustrates the automatic trajectory generation system.

The ATG system 101 is schematically illustrated in FIG. 2. The ATG system 101 is configured to take as input a set of information supplied by the avionics: the initial geographic position of the aircraft 100 (denoted A_POS, typically the current position of the aircraft 100) and geographic position information on the destination (denoted T_POS). The set of information concerned preferably further comprises: the current velocity or speed of the aircraft 100 (denoted A_VEL), the current direction of flight of the aircraft 100 (denoted A_DIR) as defined by the attitude of the aircraft 100, and information on direction to be followed to the destination (denoted T_TRK). The ATG system 101 is configured to further take account as input of a vertical trajectory profile to be observed to destination (denoted VPROF). The ATG system 101 is configured to supply as output trajectory information (denoted T_INF).

It is recalled here that a flyable trajectory is a trajectory which, at any point, exhibits a minimal (or predetermined) distance margin with respect to any identified obstacle (relief, etc.) and that the aircraft 100 can follow given its operational state (possible depressurization, loss of an engine, etc.).

To determine the trajectory information T_INF, the ATG system 101 also has information on obstacles, for example supplied by a set of databases. More particularly: a database PDTDB (for "Polygon Digital Terrain DataBase") 201, which supplies terrain elevation information in the form of polygons by altitude slices; a database PDMDB (for "Polygon Digital Military DataBase") 202, which supplies georeferencing information, preferably by altitude slices, in the form of polygons of military zones for which overflight is prohibited; a database PDWDB (for "Polygon Digital Weather DataBase") 204, which supplies georeferenced information in the form of polygons, preferentially by altitude slices, of zones to be avoided because of weather conditions (storm clouds, etc.); and a database PDB (for "Performance DataBase") 203, which supplies information on the performance levels of the aircraft 100 according to its operational state.

The abovementioned databases can be totally incorporated in a computing system of the aircraft 100. Before take-off, the databases are updated, for example using an electronic flight bag EFB. The databases can be incorporated in a computing system on the ground, for example a computer center of an airline for which the aircraft 100 operates. The updating of the databases is then performed through air-ground communication AGC. These two approaches can be combined, with a preloading of the databases before take-off and updates in flight, for example to take account of changes of data in real time (weather conditions, etc.).

The PDTDB database 201 contains descriptors of polygons representing terrain layers. Each polygon is thus associated with an altitude layer (between a lower layer bound and an upper layer bound). The set of the polygons is a quantification (approximation) of the terrain and entirely encompasses the real terrain, which means that, if a trajectory avoids these polygonal obstacles, the application of this trajectory in the real world also avoids the relief of the terrain.

The polygons representing a terrain layer must do so faithfully, which means that they cannot enlarge the terrain to the point that flyable zones are considered as obstacles and that safe trajectories are then considered as hazardous and rejected by the ATG system 101. In addition, seen from above, the polygons representing the terrain of a layer must be entirely surrounded by the polygons representing the terrain in the lower layers. This requirement is necessary to assume that the higher an aircraft, the less constraining is the relief of the terrain, which makes it possible to apply computation simplifications which speed up the search for trajectories.

In the same way, the military zones of the PDMDB database 202 and the weather obstacles of the PDWDB database 204 are represented in the form of polygons which result from a quantification (approximation) of these military zones and of these weather obstacles. For example, a polygon representing an obstacle of storm cloud type is associated with one or more altitude layers, thus making it possible to explore trajectories passing above or below the weather obstacle.

In the case of the military zones, one variable is preferentially associated with the descriptors of the corresponding polygons and indicates if the military zone is open (overflight authorized) or closed (overflight prohibited). This variable can be transmitted by radio channel to the aircraft 100 in flight to notify a change of status (open/closed) of such or such a military zone in real time.

Each polygon is defined by its edges and is associated with a floor altitude and a ceiling altitude (layer). Consequently, the databases store polygon descriptors, comprising edge descriptors including for example the following information:

Longitude and latitude of a vertex of the edge
Longitude and latitude of the other vertex of the edge
Floor altitude of the layer
Ceiling altitude of the layer
Identifier of the polygon to which the edge belongs
Edge identifier within the polygon.

Each polygon descriptor can thus be composed of consecutive edge descriptors, preferentially presented, in an ordered manner, in the clockwise or anticlockwise direction of travel around the periphery of the polygon concerned.

In the case or weather obstacles, the corresponding polygon descriptors contain, for example, the following information:

Date stamp
Overall speed of the obstacle, with direction of displacement
Growth factor.

Furthermore, for greater accuracy, each edge descriptor of the weather obstacle polygon can contain information on velocity, or speed, of each vertex of the edge. Thus, by virtue of this information, the ATG system 101 is able to extrapolate, from the instant given by the time-stamp and using a weather model, dynamic changes of form of the polygons concerned.

Additional information can potentially be stored if used frequently and if that makes it possible to save computation time. For example, each edge descriptor can indicate if the polygon is convex or concave at the first vertex, or if the edge belongs or does not belong to a convex polygon envelope.

Thus, when the ATG system 101 performs a real-time computation of a trajectory to be followed to bring the aircraft 100 from a current geographic position in flight, to a georeferenced destination, the ATG system 101 manipulates polygons as disclosed hereinbelow.

Figure 3:
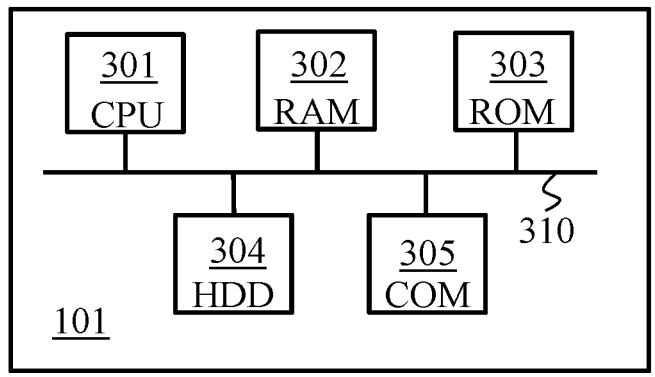
FIG. 3 schematically illustrates an example of hardware architecture of the automatic trajectory generation system.

FIG. 3 schematically illustrates an example of hardware architecture of the ATG system 101, which then comprises, linked by a communication bus 310: a processor CPU ("Central Processing Unit") 301; a random-access memory RAM 302; a read-only memory ROM 303, for example a Flash memory; a data storage device, such as a hard disk drive HDD or a storage medium reader, such as an SD ("Secure Digital") card reader 304; at least one communication interface 305 allowing the ATG system 101 to interact in the avionics of the aircraft 100.

The processor 301 is capable of executing instructions loaded into the RAM 302 from the ROM 303, from an external memory (not represented), from a storage medium, such as an SD card, or from a communication network (not represented). When the ATG system 101 is powered up, the processor 301 is capable of reading instructions from the RAM 302 and of executing them. These instructions form a computer program causing the implementation by the processor 301 of the behaviors, steps and algorithms described here.

All or part of the behaviors, steps and algorithms described here can thus be implemented in software form by the execution of a set of instructions by a programmable machine, such as a DSP ("Digital Signal Processor") or a microcontroller, or be implemented in hardware form by a dedicated machine or component ("chip") or a dedicated set of components ("chipset"), such as an FPGA ("Field-Programmable Gate Array") or an ASIC ("Application-Specific Integrated Circuit"). Generally, the ATG system 101 comprises electronic circuitry arranged and configured to implement the behaviors, steps and algorithms described here.

Figure 4:
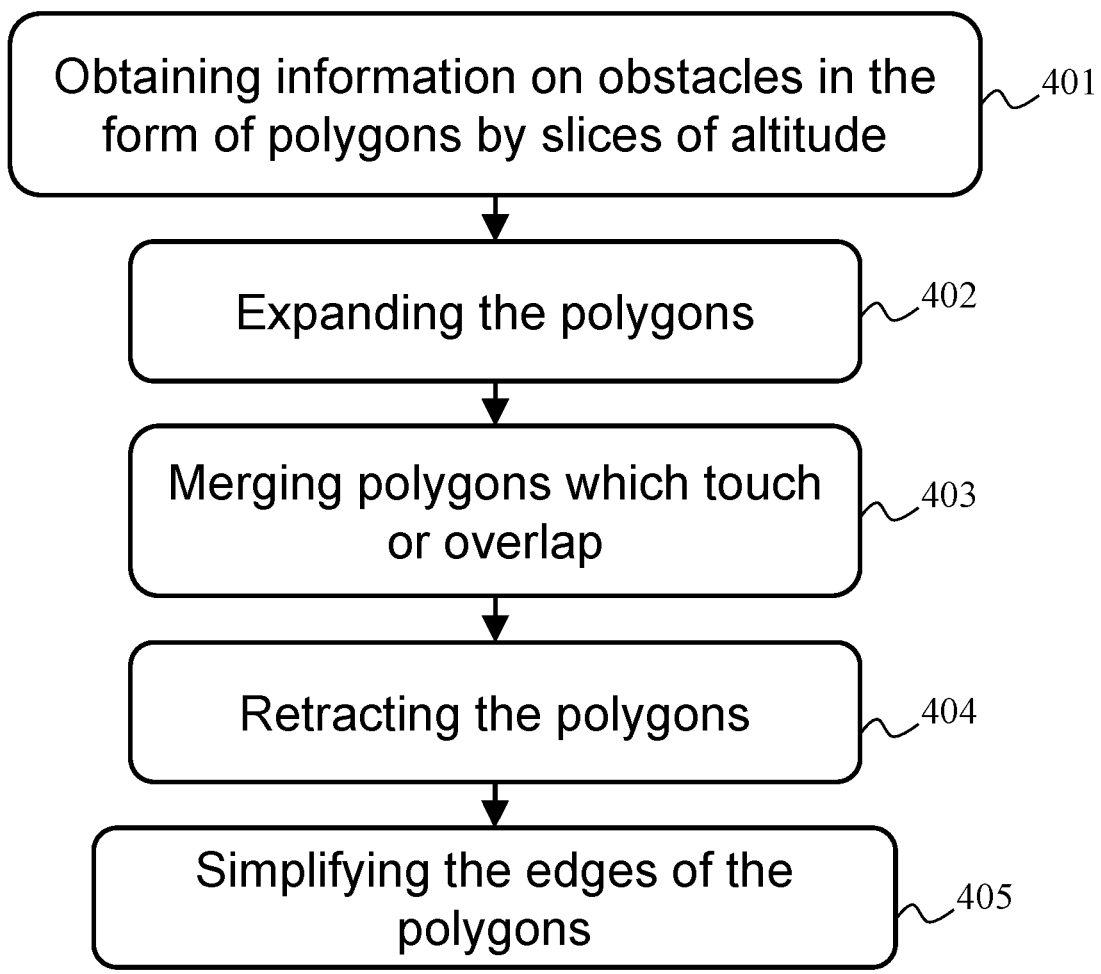
FIG. 4 schematically illustrates an algorithm for simplifying all the polygons.

To perform the trajectory computation, the ATG system 101 manipulates the polygons so as to limit the quantity of candidate trajectories studied. Thus, FIG. 4 schematically illustrates an algorithm for simplification of all the polygons implemented, in a particular embodiment, by the ATG system 101 to potentially merge certain polygons. The ATG system 101 performs an expansion—retraction operation which makes it possible to merge the polygons which are too close to one another to make it possible in reality to navigate the aircraft 100 between the obstacles that they represent, while observing a protection corridor. These operations of expansion, merging and retraction of the polygons are preferentially performed upstream of a search for a trajectory that is flyable for the aircraft 100, and not in real time, in order to limit the computation times.

Figure 7:
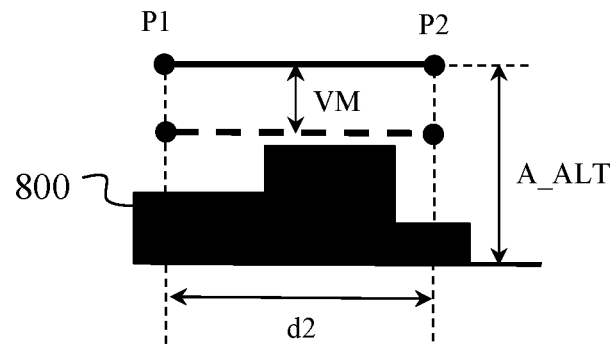
FIG. 7 schematically illustrates, in a side view, a vertical margin to be observed to be able to consider a trajectory as flyable.
Figure 8:
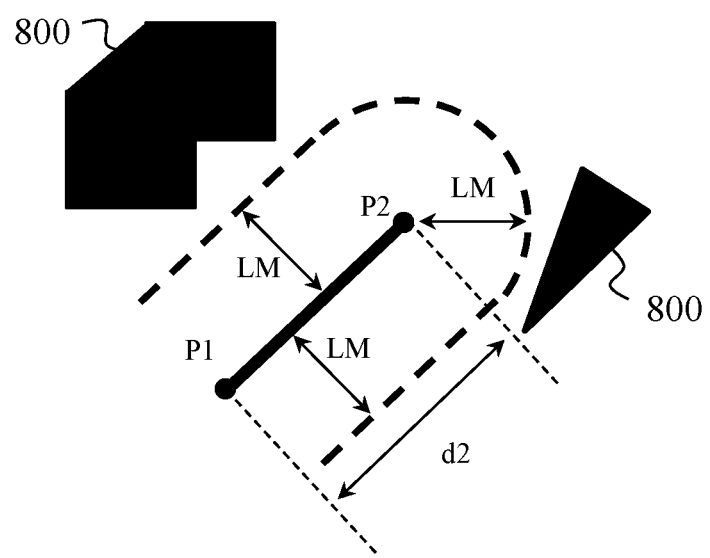
FIG. 8 schematically illustrates, in a top view, a lateral margin to be observed to be able to consider a trajectory as flyable.

Indeed, a lateral margin LM must be observed laterally in the trajectory computation with respect to the obstacles to be avoided, as illustrated in FIG. 8 in which, over a distance d2 from a point P1 to a point P2, the lateral margin LM is free of any obstacle 800. The lateral margin LM can be predetermined or variable as a function of the altitude, of the mode of flight of the aircraft 100 or of the geographic zone, for example. Moreover, a vertical margin VM must also be observed vertically in the trajectory computation with respect to the obstacles to be avoided, as illustrated in FIG. 7 in which, over the distance d2 from the point P1 to the point P2, the vertical margin VM is free of any obstacle 800. The vertical margin VM and the lateral margin LM make it possible to ensure safe instrument navigation, that is to say, ensure a safe and flyable trajectory.

In a step 401, as already described, the ATG system 101 obtains obstacle information in the form of polygons by altitude slices.

In a step 402, the ATG system 101 expands the polygons. In other words, the ATG system 101 enlarges the polygons in all directions (in the layer considered). In each direction, the lateral margin LM is added.

Figure 5A:
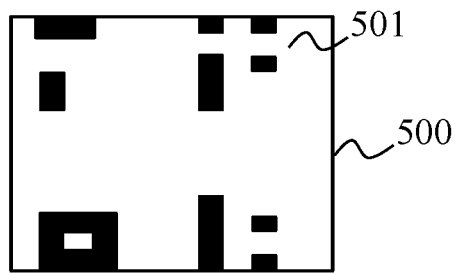
FIG. 5A schematically illustrates an example of terrain elevation polygons to be simplified.
Figure 5B:
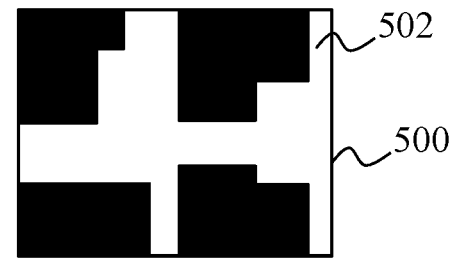
FIG. 5B continues the example of FIG. 5A after an expansion operation.

Then, in a step 403, for each layer, the ATG system 101 merges the polygons which touch or overlap (by altitude layer). As an example, FIG. 5B schematically shows a set of polygons 502 in a predetermined zone 500, which results from the expansion and from the merging of a set of polygons 501 schematically illustrated in FIG. 5A.

Figure 5C:
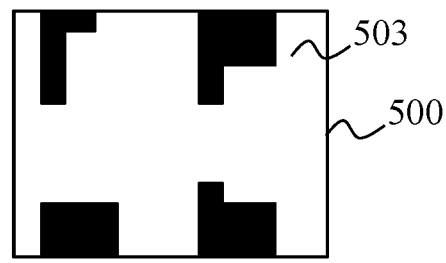
FIG. 5C continues the example of FIGS. 5A and 5B after a retraction operation.

And, in a step 404, the ATG system 101 retracts the polygons, out of the possible mergings, by the same proportion as in step 402. As an example, FIG. 5C schematically shows a set of polygons 503, which results from the retraction of the set of polygons 502 schematically illustrated in FIG. 5B.

Thus, the quantity of polygons to be manipulated is reduced, without in any way discarding trajectories which would be flyable. The steps 402, 403 and 404 thus make it possible to simplify the representation of the terrain, by keeping only the obstacles between which the aircraft 100 can navigate. The ATG system 101 avoids studying obstacle-circumventing trajectories which would not make it possible to observe the protection corridor.

Figure 6A:
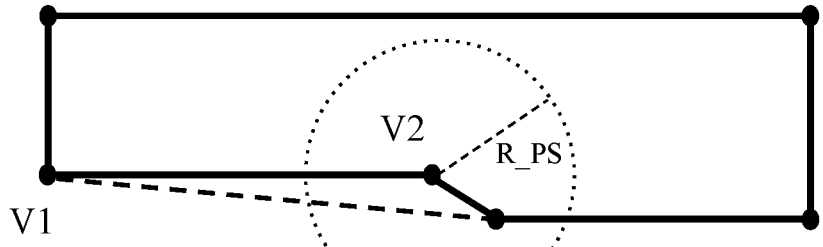
FIG. 6A schematically illustrates an example of a terrain elevation polygon, the edges of which are simplified.
Figure 6B:
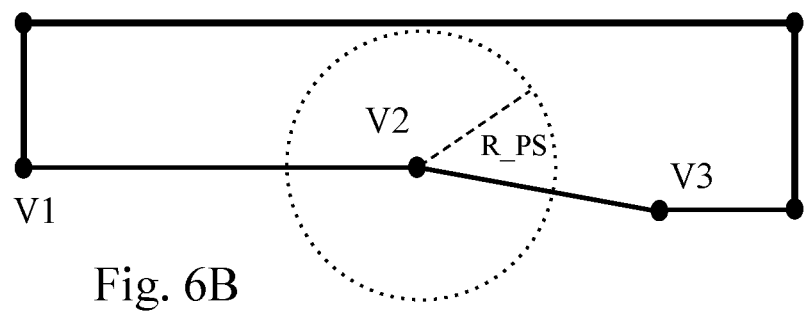
FIG. 6B schematically illustrates an example of a form of terrain elevation polygon, the edges of which are not simplified.

In a step 405, the ATG system 101 seeks to simplify the edges of the polygons. According to one configuration, the ATG system 101 identifies all the polygon vertices which are located in a concave part of the polygon. The ATG system 101 determines, for each of them, if at least one of its two neighboring vertices is located at a distance less than a simplification threshold (circle of radius R_PS in FIGS. 6A and 6B). If such is the case, the ATG system 101 deletes the concavity and directly links the two neighboring vertices; otherwise, the ATG system 101 conserves the form of the polygon. FIG. 6A schematically illustrates a polygon in which a vertex V2 is in a concavity between a vertex V1 and a vertex V3. The vertex V3 is at a distance from the vertex V2 less than the simplification threshold R_PS. In this case, the ATG system 101 deletes the edges which link the vertex V1 to the vertex V2 and the vertex V2 to the vertex V3, and, in replacement, creates an edge which directly links the vertex V1 to the vertex V2. The vertex V2 then disappears. FIG. 6B schematically illustrates a polygon in which the vertex V3 is at a distance from the vertex V2 greater than the simplification threshold R_PS. Here, the vertex V2 is conserved. Obviously, the invention is not limited to this configuration of simplification of the edges of the polygons. The configuration presented here is a concrete example for the case of polygon vertices which are located in a concave part of the polygon and according to a criterion of distance to the neighbors.

Thus, the polygons to be manipulated are of simpler forms, and have fewer vertices, which reduces the quantity of candidate trajectories to be studied. This simplification of the polygon edges is optional and can be performed independently of the expansion-merging-retraction operations.

Figure 9:
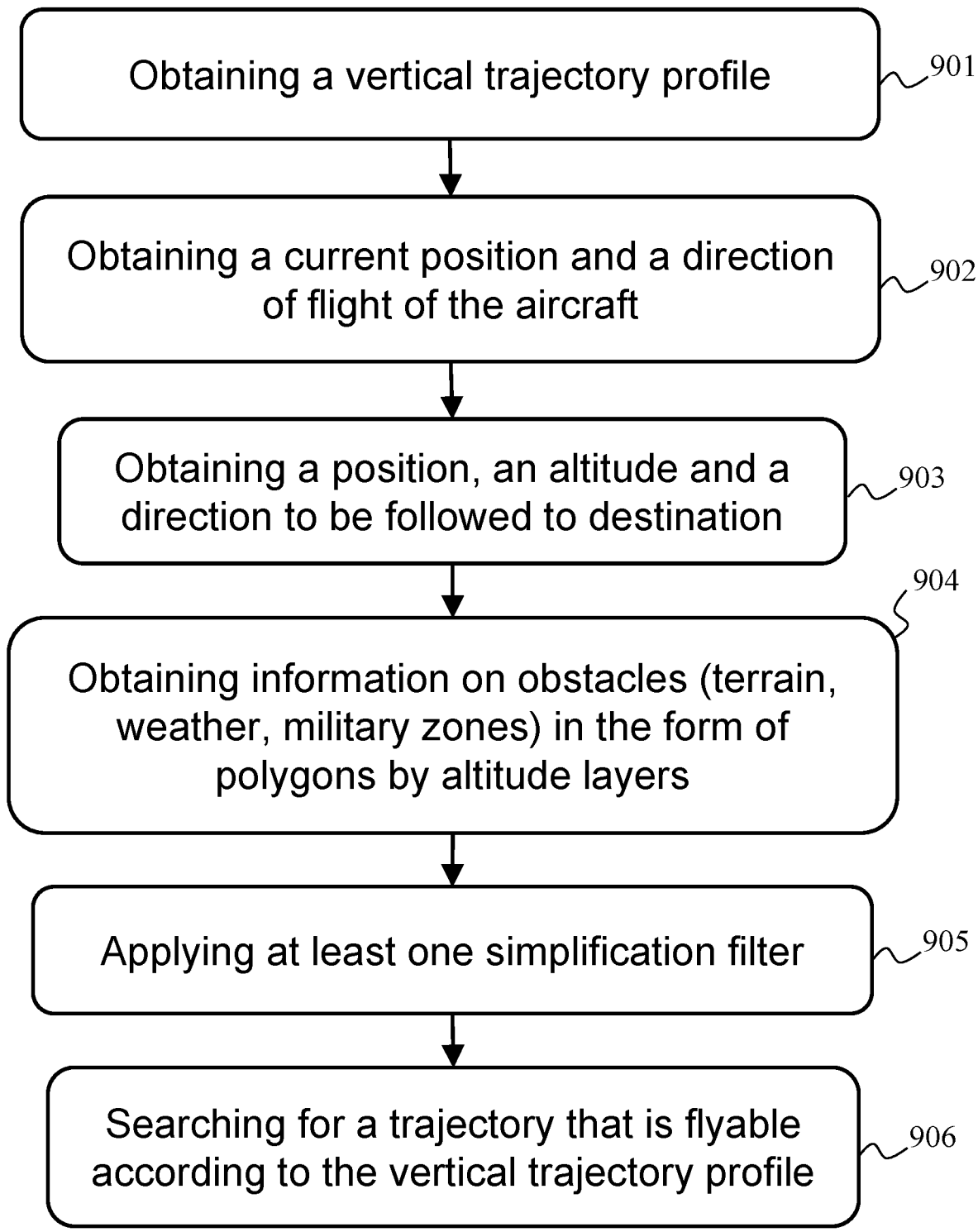
FIG. 9 schematically illustrates an algorithm preparatory to a search for a lateral trajectory.

FIG. 9 schematically illustrates an algorithm preparatory to a search for a lateral trajectory.

Figure 10A:
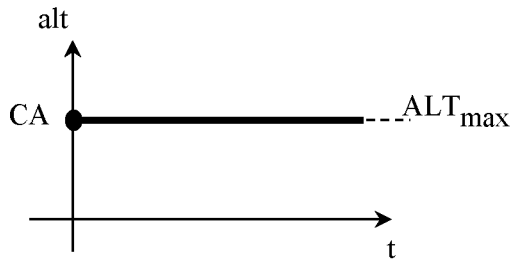
FIG. 10A schematically illustrates a first example of vertical trajectory profile.
Figure 10B:
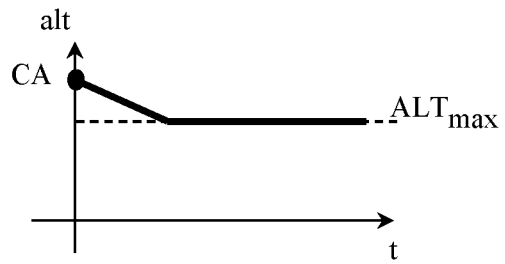
FIG. 10B schematically illustrates a second example of vertical trajectory profile.
Figure 10C:
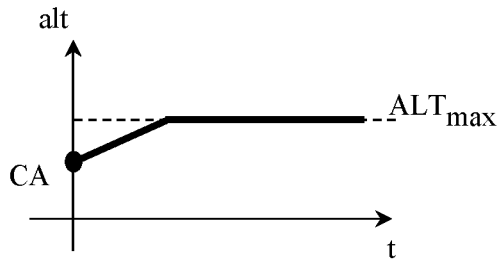
FIG. 10C schematically illustrates a third example of vertical trajectory profile.
Figure 10D:
FIG. 10D schematically illustrates a fourth example of vertical trajectory profile.
Figure 10E:
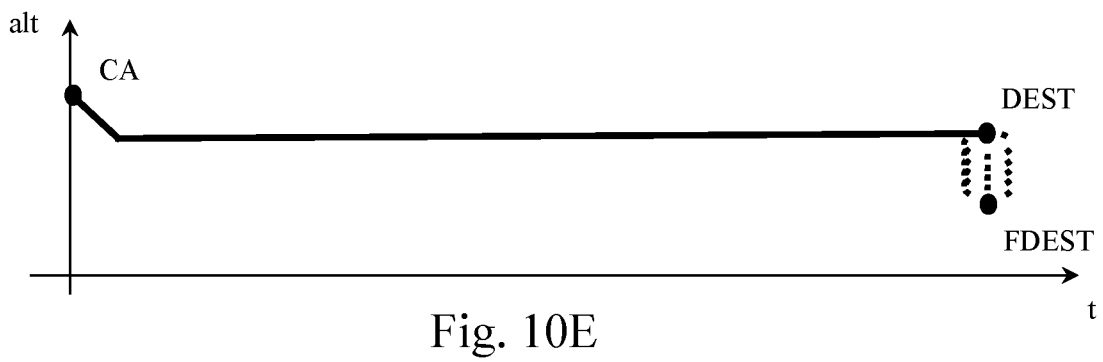
FIG. 10E schematically illustrates a fifth example of vertical trajectory profile.

In a step 901, the ATG system 101 obtains a vertical trajectory profile. The vertical trajectory profile to be observed is pre-established. The vertical trajectory profile defines the variations of altitude expected by the aircraft 100. For example, if a cabin depressurization is in progress, the ATG system 101 must take account of a descent by levels in order to bring the aircraft 100 to a maximum altitude ALTmax defined in light of the operational state of the aircraft 100. FIG. 10A schematically illustrates a first example of vertical trajectory profile. In this example, no change of altitude is made and the current altitude CA of the aircraft 100 is maintained for example at the maximum altitude value ALTmax. If the current altitude CA of the aircraft 100 is greater than the maximum altitude ALTmax defined in light of the operational state of the aircraft 100, the vertical trajectory profile descends to bring the aircraft 100 to fly at the authorized maximum altitude ALTmax, as illustrated schematically in FIG. 10B. If the current altitude CA of the aircraft 100 is less than the authorized maximum altitude ALTmax, the vertical trajectory profile can rise to bring the aircraft 100 to fly at the maximum altitude ALTmax and face an environment (terrain relief in particular) that is less restrictive, as illustrated schematically in FIG. 10C. In the case where the maximum altitude ALTmax is less than the current altitude CA of the aircraft 100 because of a cabin depressurization, the vertical trajectory profile incorporates cabin depressurization procedures and observes a descent by levels, as illustrated schematically in FIG. 10D. As illustrated in FIG. 10E, the vertical trajectory profile can take account of a quantity of iterations of a waiting circuit scheme (see dotted lines in FIG. 10E) between the destination (denoted DEST) for which a lateral trajectory is to be found and the final destination (denoted FDEST) which is located below. In another embodiment, the vertical trajectory profile can incorporate a descent trajectory.

In a step 902, the ATG system 101 obtains the current position A_POS of the aircraft 100, the direction of flight A_DIR of the aircraft 100, and the current speed A_VEL of the aircraft 100. The current speed A_VEL of the aircraft 100 makes it possible to determine the radius of a very first turn that the aircraft may be made to perform to follow the trajectory established by the ATG system 101.

In a step 903, the ATG system 101 obtains the position T_POS of the destination DEST, as well as its altitude and the direction to be followed T_TRK to destination.

In a step 904, the ATG system 101 obtains information on obstacles (terrain, weather, military zones) in the form of polygons by altitude layers. This information in the form of polygons is obtained from databases PDTDB 201, PDMDB 202 and PDWDB 204 previously mentioned. For example, the ATG system 101 obtains information on obstacles present in a geographic zone of predetermined surface area which includes the current position of the aircraft 100 and the position of the destination. This geographic zone is preferably the smallest possible, so as to obtain the information on obstacles present within a minimal geographic zone including the current position of the aircraft 100 and the position of the destination and making it possible to find a path from the current position of the aircraft 100 to the position of the destination.

In an optional step 905, the ATG system 101 applies at least one filter for simplification of the polygons to be avoided in the trajectory computation. For example, such a filter is applied through polygon expansion-merging-retraction operations and/or operations of simplification of the polygon edges already described in relation to FIGS. 4, 5A, 5B, 5C, 6A and 6B. Simplification filters can notably be applied as a search for a flyable trajectory proceeds. Preferably, these filterings, which may necessitate significant computation times, are performed on the ground, prior to a flight, during the construction of the database PDTDB 201.

In a particular filtering embodiment, the ATG system 101 performs a search for a lateral trajectory by circumvention of vertices only by considering the vertices of polygons that are relevant in light of the vertical trajectory profile. Thus, in the case where the trajectory search must be performed at constant altitude, only the lowest layer out of those which are not lower than the altitude of the aircraft 100 minus the vertical margin VM is taken into account. In the case of a climb or descent, the same reasoning is applied so as to keep only the layers which are relevant in light of the altitude interval considered in the vertical trajectory profile.

In a step 906, the ATG system 101 searches for a flyable trajectory from the current position A_POS of the aircraft to the position of the destination T_POS, by following the vertical trajectory profile obtained in the step 901, and by therefore avoiding the obstacles represented by the polygons obtained in the step 904. The trajectory search preferably takes account of the current direction A_DIR of flight of the aircraft 100, as well as the direction to be followed T_TRK to destination, and the performance levels of the aircraft 100 in light of its operational state.

Thus, preferentially, the ATG system 101 calculates the lateral trajectory, on leaving the position A_POS, relying on two first circles representative of any first turn that the aircraft 100 must perform from the position A_POS to observe the current direction A_DIR: a first circle centered on the left with respect to the position A_POS and another first circle centered on the right with respect to the position A_POS. Likewise, the ATG system 101 calculates the lateral trajectory, on arrival at the position T_POS, relying on two second circles representative of any final turn that the aircraft 100 must perform on arrival at the position T_POS to observe the direction T_TRK: a second circle centered on the left with respect to the position T_POS and another second circle centered on the right with respect to the position T_POS. By considering that there is no obstacle between the current position A_POS of the aircraft 100 and the position T_POS of the destination, the possible trajectories are schematically illustrated in FIGS. 11A to 11D.

In FIG. 11A, the trajectory is such that the aircraft 100 performs a turn to the left from the position A_POS, follows the first circle centered on the left with respect to the position A_POS, then follows a tangent to the second circle centered on the left with respect to the position T_POS and performs a turn to the left following the second circle to the position T_POS of the destination. In FIG. 11B, the trajectory is such that the aircraft 100 performs a turn to the left from the position A_POS, follows the first circle centered on the left with respect to the position A_POS, then follows a tangent to the second circle centered on the right with respect to the position T_POS and performs a turn to the right in following the second circle to the position T_POS of the destination. In FIG. 11C, the trajectory is such that the aircraft 100 performs a turn to the right from the position A_POS, follows the first circle centered on the right with respect to the position A_POS, then follows a tangent to the second circle centered on the left with respect to the position T_POS and performs a turn to the left in following the second circle to the position T_POS of the destination. In FIG. 11D, the trajectory is such that the aircraft 100 performs a turn to the right from the position A_POS, follows the first circle centered on the right with respect to the position A_POS, then follows a tangent to the second circle centered on the right with respect to the position T_POS and performs a turn to the right in following the second circle to the position T_POS of the destination.

It should be noted that it is still possible to allow the aircraft 100 to perform a turn to the left as much as a turn to the right at the start of the trajectory search. If the aircraft 100 is in the course of a turn to the right, and it is desirable for the aircraft 100 to then make a turn to the left, a margin is introduced to allow a trajectory search with a turn to the left.

For example, the ATG system 101 can perform, in a first stage, a lateral trajectory computation from the position A_POS to the position T_POS, by then taking account of the current direction A_DIR of flight of the aircraft 100, as well as the direction to be followed T_TRK to destination, and the performance levels of the aircraft 100 in light of its operational state.

Figure 12:
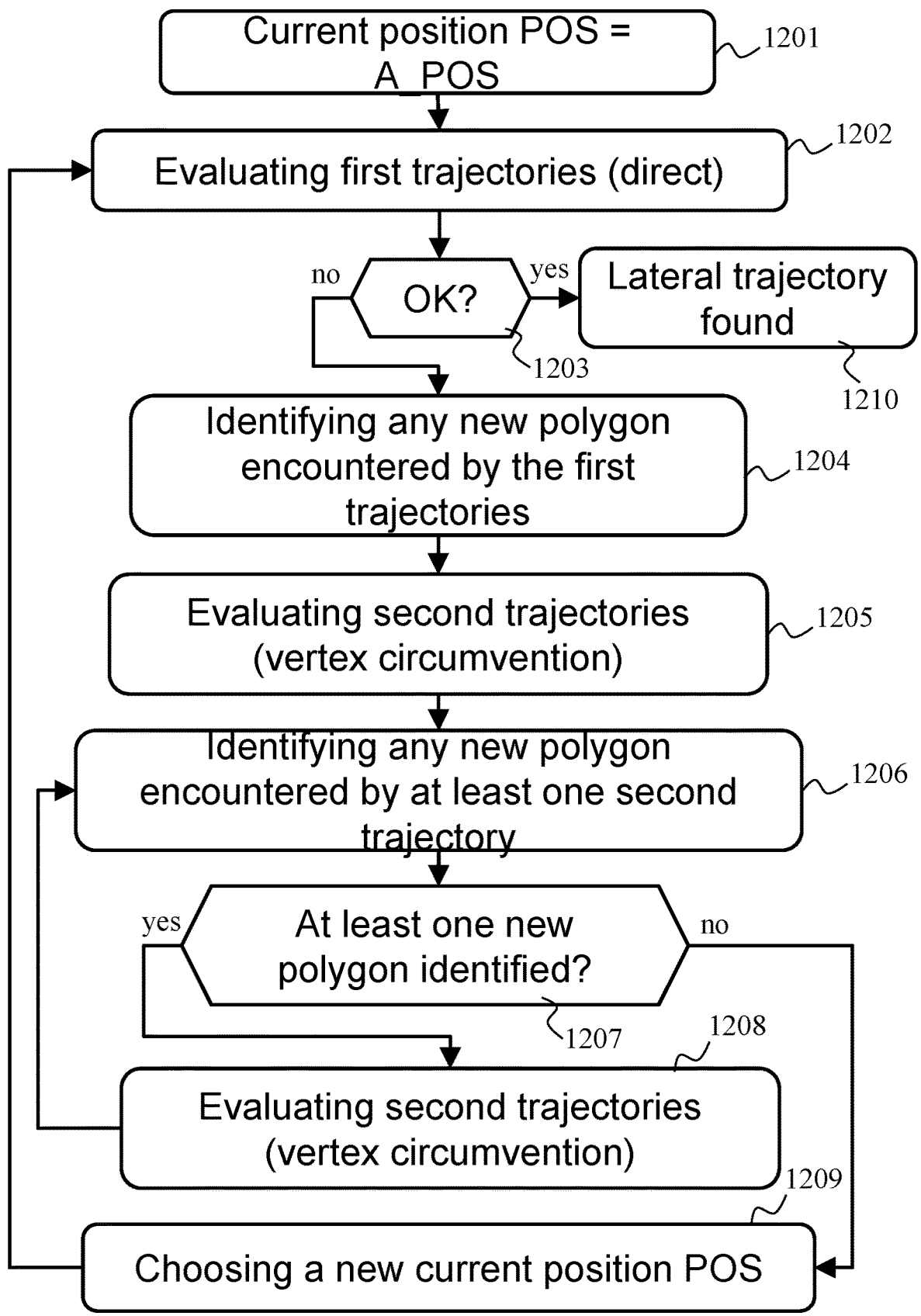
FIG. 12 schematically illustrates a lateral trajectory search algorithm.

FIG. 12 schematically illustrates a lateral trajectory search algorithm. The algorithm searches successively for portions of trajectory by circumvention of the vertices of the polygons representing the obstacles to be avoided. The ATG system 101 performs trajectory evaluations, by advancing a current position POS from polygon vertex to polygon vertex, until a direct trajectory without obstacles with the destination is found.

In a step 1201, the ATG system 101 establishes the current position POS at the position A_POS.

In a step 1202, the ATG system 101 evaluates first, direct trajectories (as described above in relation to FIGS. 11A to 11D), between the current position POS and the position T_POS at the destination. The ATG system 101 thus determines if there is at least one direct flyable trajectory between the current position POS and the position T_POS at the destination, by taking account of the direction of flight of the aircraft 100 at the current position, as well as the direction to be followed T_TRK to destination, of if at least one obstacle exists between these two positions.

In the evaluation of the first trajectories, the ATG system 101 takes account of the abovementioned margin LM to determine if the first trajectories are or are not flyable.

In a step 1203, the ATG system 101 checks to see if at least one of the first trajectories is flyable. If such is the case, a step 1210 is performed; otherwise, a step 1204 is performed.

In the step 1204, the ATG system 101 identifies any new polygon encountered by the first trajectories evaluated in the step 1202. In other words, the ATG system 101 keeps track of each polygon encountered in the course of its potential lateral trajectory calculations. If a polygon is on the path of one of the first trajectories evaluated in step 1202 and this polygon had not been encountered previously, the polygon is identified in the step 1204, and this polygon will then be considered to be circumvented.

In a step 1205, the ATG system 101 evaluates second trajectories between the current position POS and each polygon vertex identified in the step 1204 or in any preceding iteration. The second trajectories are trajectories which aim to circumvent the obstacle represented by the polygon by circumventing the vertex concerned. The ATG system 101 thus determines whether there is a trajectory that is flyable between the current position POS and each polygon vertex identified in the step 1204 or in any preceding iteration, or if at least one obstacle exists between these two positions. Only the vertices which offer a trajectory that is flyable from the current position POS are retained as potential lateral trajectory continuation track from the current position POS.

In the evaluation of the second trajectories, the ATG system 101 takes account of the abovementioned margin LM to determine if the second trajectory considered is or is not flyable.

In a step 1206, the ATG system 101 identifies any new polygon encountered by the second trajectories evaluated in the step 1205 (as in the step 1204 with respect to first trajectories).

In a step 1207, the ATG system 101 checks to see if at least one new polygon has been identified in the step 1204 or in the step 1206. If such is the case, a step 1208 is performed; otherwise, a step 1209 is performed.

In the step 1208, the ATG system 101 evaluates the second trajectories between each preceding current position and each new polygon vertex identified in the step 1204 or in the step 1206. Thus, the ATG system 101 takes account of the new polygons, to evaluate the potential circumvention thereof, retroactively with respect to the positions already studied previously. The ATG system 101 thus determines if there is a trajectory that is flyable between each preceding current position and each polygon vertex identified in the step 1204 or 1206, or if at least one obstacle exists between these two positions. The step 1206 is then repeated with these second newly evaluated trajectories, to identify if yet at least one new polygon has been encountered.

In the step 1209, the ATG system 101 chooses a new current position POS from among the vertices of the polygons identified since the start of the lateral trajectory search, in order to continue the lateral trajectory search from this new current position POS. Each identified polygon vertex is for example associated with a heuristic, or with a cost of inclusion of the circumvention of the vertex in the lateral trajectory to the destination, in order to allow the ATG system 101 to know the order in which to choose the new current position POS from among the vertices of the polygons identified since the start of the lateral trajectory search. Then, the step 1202 is repeated, and the ATG system 101 thus reiterates until a current position POS is found for which at least one first trajectory exists without encountering any polygon.

In the step 1210, the algorithm is terminated. The ATG system 101 has found a lateral trajectory that is flyable from the position A_POS to the position T_POS by circumventing the obstacles present in light of the pre-established vertical trajectory profile. By preceding thus, that is to say, by gradually discovering the polygons to be effectively considered to perform the circumventions by vertices, the ATG system 101 limits the quantity of calculations to be performed and therefore the computation time to obtain a flyable lateral trajectory.

Figure 13A:
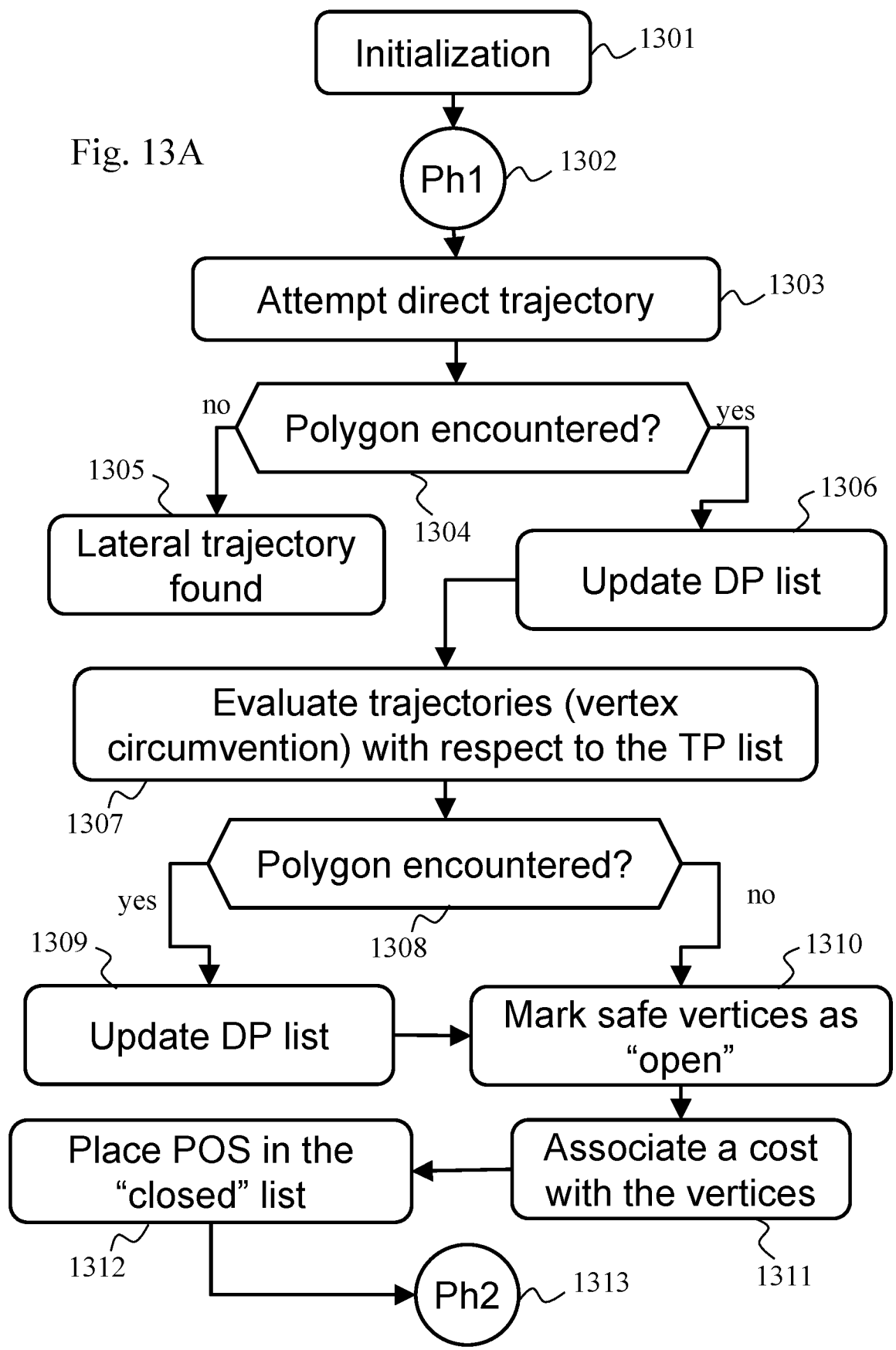
FIG. 13A schematically illustrates a first part of a lateral trajectory search algorithm, in a particular embodiment.
Figure 13B:
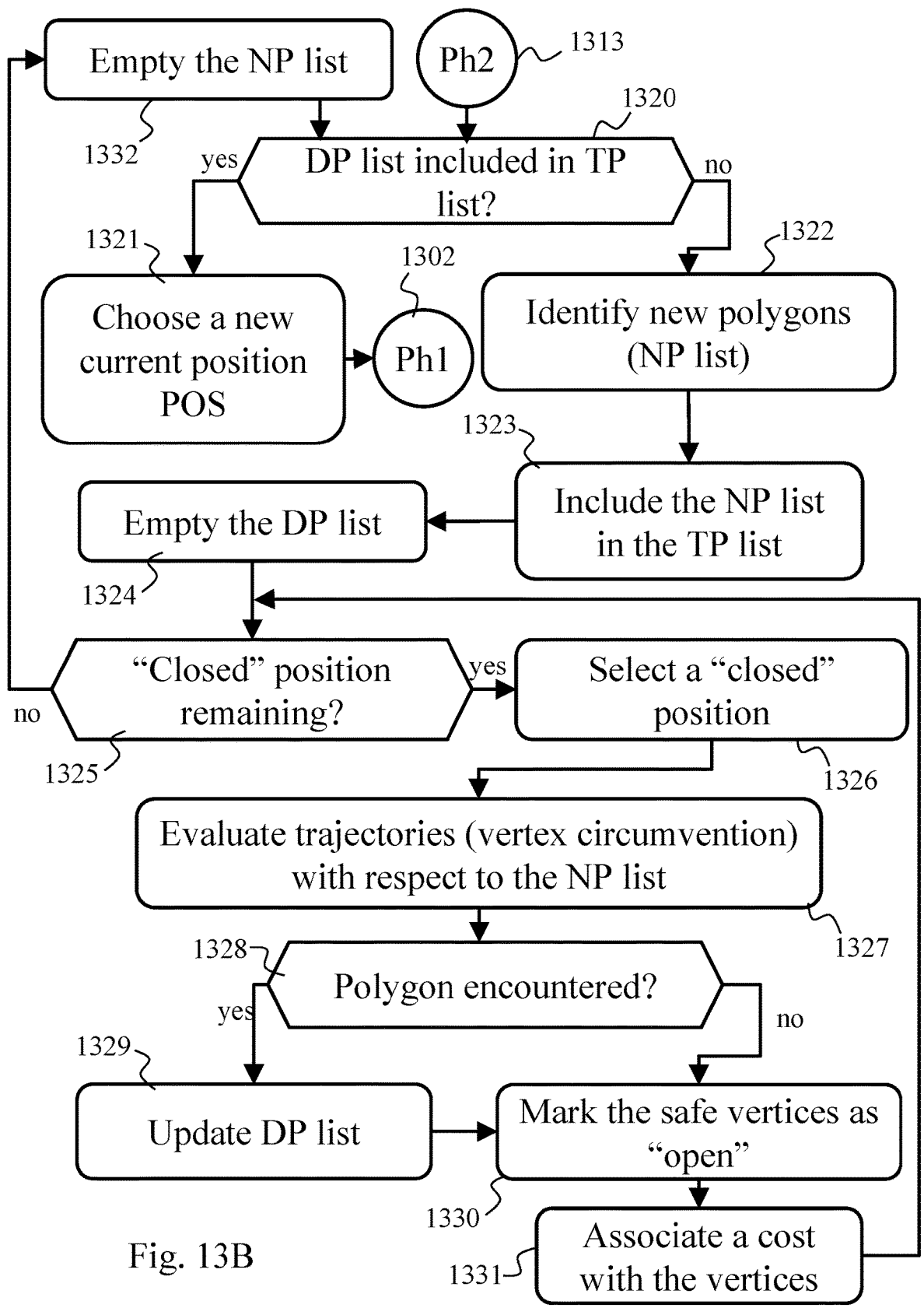
FIG. 13B schematically illustrates a second part of a lateral trajectory search algorithm, in the particular embodiment illustrated in FIG. 13A.

FIGS. 13A and 13B schematically and jointly illustrate an implementation of a lateral trajectory search algorithm, in a particular embodiment.

In a step 1301, the ATG system 101 performs an initialization, in which the ATG system 101 establishes the current position POS at the position A_POS, that is to say, at the point of departure of the lateral trajectory to be found. Furthermore, the ATG system 101 initializes empty DP, TP and NP lists. The DP list is intended to store polygons detected during the execution of the algorithm of FIGS. 13A and 13B. The TP list is intended to store all of the polygons already targeted in the execution of the algorithm of FIGS. 13A and 13B, namely the polygons which have already been considered from previously considered current positions of the aircraft. The NP list is intended to store newly detected polygons, namely each polygon which would be present in the DP list, but which would not yet be present in the TP list.

In a step 1302, the ATG system 101 initiates a phase Ph1. The phase Ph1 aims to investigate whether there is a direct trajectory between the current position POS and the destination, and to investigate the possible circumventions of vertices from the current position POS, so as to evaluate the possible progressions of the lateral trajectory from the current position POS to circumvent one or more obstacles possibly remaining (in the TP list) to reach the destination.

In a step 1303, the ATG system 101 performs an attempted direct flight trajectory from the current position POS to the position T_POS of the destination (first trajectories in the algorithm of FIG. 12).

In a step 1304, the ATG system 101 checks to see if there is at least one obstacle, that is to say, at least one polygon, encountered on the trajectory attempted in the step 1303. If such is the case, a step 1306 is performed; otherwise, a step 1305 is performed.

In the step 1305, the ATG system 101 has found a flyable trajectory allowing the aircraft 100 to link the destination from the position A_POS, and the algorithm of FIGS. 13A and 13B is terminated.

In the step 1306, the ATG system 101 updates the DP list by listing therein the polygons detected, that is to say, the polygons encountered on the trajectory attempted in the step 1303 and therefore identified as to be taken into account for the generation of the lateral trajectory by circumventions of vertices.

In a step 1307, the ATG system 101 searches for the vertices of the polygons present in the TP list and evaluates whether there is a direct flyable trajectory to the vertices (second trajectories in the algorithm of FIG. 12) in order to continue the trajectory by circumvention of the vertices.

In a step 1308, the ATG system 101 checks to see if there is at least one obstacle, that is to say, at least one polygon, encountered on the trajectory attempted in the step 1303. If such is the case, a step 1309 is performed; otherwise, a step 1310 is performed.

In the step 1309, the ATG system 101 updates the DP list by listing therein the polygons detected, that is to say, the polygons encountered on the trajectory attempted in the step 1307 and therefore identified as to be taken into account for the generation of the lateral trajectory by circumventions of vertices, and the step 1310 is performed.

In the step 1310, the ATG system 101 marks, in a descriptor, each of the vertices found in the step 1307 and for which there is a direct flyable trajectory (the expression "safe" vertex applies), as "open". That means that the circumvention of the polygon vertex concerned is potentially to be studied to advance the lateral trajectory currently being calculated to the destination.

In a step 1311, the ATG system 101 preferentially associates, in the descriptor, with each vertex found in the step 1307, a heuristic or a cost of inclusion of the circumvention of the vertex in the lateral trajectory to the destination. For example, the heuristic is chosen as the length of the path which goes from the current position of the aircraft 100 to the vertex concerned plus an underestimation of the path length lacking to arrive at destination. As underestimation, the distance as the crow flies between the vertex concerned and the destination can be used.

In a step 1312, the ATG system 101 marks, in the descriptor, the current position POS as "closed". The ATG system 101 thus indicates that the potential tracks for continuation of the lateral trajectory by circumventions of vertices from the current position POS have been identified in light of the polygons already identified as relevant (in the TP list).

In a step 1313, the ATG system 101 initiates a phase Ph2. The phase Ph2 aims to investigate the possible circumventions of vertices, for the polygons newly detected and therefore identified as relevant for the calculation of the lateral trajectory, from each previously evaluated current position, namely each of the positions which have been marked as "closed".

Thus, in a step 1320, the ATG system 101 checks to see if all the polygons listed in the DP list are listed in the TP list. If such is the case, all the polygons detected from the current position POS had already been so detected previously, and a step 1321 is performed; otherwise, a step 1322 is performed.

In the step 1321, the ATG system 101 chooses a new current position POS from among the vertices of the polygons identified since the start of the lateral trajectory search, in order to continue the lateral trajectory search from this new current position POS. Each polygon vertex identified is for example associated with a heuristic, or with a cost of inclusion of the circumvention of the vertex in the lateral trajectory to the destination, in order to allow the ATG 101 to know the order in which to choose the new current position POS from among the vertices of the polygons identified since the start of the lateral trajectory search. Next, the phase Ph1 is repeated from the chosen new current position POS.

In the step 1322, the ATG system 101 identifies the new polygons, that is to say, the polygons which are listed in the DP list that which are not listed in the TP list. The ATG system 101 thus forms the NP list with these new polygons.

In a step 1323, the ATG system 101 includes the NP list in the TP list. Thus, the list of the polygons identified as relevant for the generation of the lateral trajectory is updated with the newly encountered polygons.

In a step 1324, the ATG system 101 empties the DP list, given that all the polygons which are listed therein have been incorporated in the TP list, in this iteration (NP list) or a preceding iteration.

In a step 1325, the ATG system 101 checks to see if there is a position, marked as "closed", remaining to be processed with respect to the new polygons listed in the NP list. If such is the case, a step 1326 is performed; otherwise, a step 1332 is performed, in which the NP list is emptied, before repeating the step 1320 (at least one new polygon may have been identified as relevant in a step 1328 described hereinbelow).

In the step 1326, the ATG system 101 selects (for example, arbitrarily) one position marked as "closed" (that is to say, a preceding current position POS, or, in other words, a position selected in a preceding iteration as current position POS), remaining to be processed with respect to the new polygons listed in the NP list.

In a step 1327, the ATG system 101 evaluates direct trajectories between the position selected in the step 1326 and each of the vertices of polygons of the list NP, in order to determine if one or more other new polygons would be encountered by these trajectories (second trajectories in the algorithm of FIG. 12). Thus, the ATG system 101 takes account of the new polygons identified in the NP list, to evaluate the potential circumvention thereof, retroactively with respect to the position which was selected in the step 1326, and which has already been studied previously. The ATG system 101 thus determines if there is a trajectory that is flyable between the position which was selected in the step 1326 and each identified polygon vertex in the NP list, or if at least one new obstacle (not yet identified in the TP list) exists between these two positions.

In a step 1328, the ATG system 101 checks to see if there is at least one obstacle, that is to say, at least one polygon, newly encountered on one of the trajectories evaluated in the step 1327. In other words, the ATG system 101 checks to see if there is at least one polygon encountered on one of the trajectories evaluated in the step 1327. If such is the case, a step 1329 is performed; otherwise, a step 1330 is performed.

In the step 1329, the ATG system 101 updates the DP list by including therein information representative of each polygon which would have been newly encountered on one of the trajectories evaluated in the step 1327. The step 1330 is then performed.

In the step 1330, the ATG system 101 marks, in the descriptor, each of the vertices of the polygons newly encountered on one of the trajectories evaluated in the step 1327 and for which there is a direct flyable trajectory (as stated previously, the term "safe" vertex applies), as "open".

That means that the circumvention of the polygon vertex concerned is potentially to be studied to advance the lateral trajectory currently being calculated to the destination.

In a step 1331, the ATG system 101 preferentially associates, in the descriptor, with each vertex of the polygons newly encountered on one of the trajectories evaluated in the step 1327, a heuristic or a cost of inclusion of the circumvention of the vertex in the lateral trajectory to the destination, as already described. Next, the step 1325 is repeated to process another "closed" position, if one such remains to be processed with respect to the new polygons listed in the NP list.

In a particular filtering embodiment, the ATG system 101 performs a search for a lateral trajectory by circumvention of vertices only by considering the vertices of polygons that are relevant in light of the vertical trajectory profile. Thus, in the case where the trajectory search must be performed at constant altitude, only the lowest layer out of those which are not lower than the altitude of the aircraft 100 minus the vertical margin VM is taken into account. In the case of a climb or a descent, the same reasoning is applied to keep only the layers which are relevant in light of the altitude interval considered in the vertical trajectory profile.

In one embodiment, the ATG system 101 generates an alert when no lateral trajectory has been able to be found to reach the destination in the given conditions. Another destination must then be selected and/or another direction to be followed to destination and/or another vertical trajectory profile. Considering for example that a trajectory computation system of the avionics has access to a database comprising an ordered list of possible destinations (for example: airports), for example diverting the aircraft 100 in an emergency following a cabin depressurization, the trajectory computation system submits to the ATG system 101 the destinations according to the ordered list. If the ATG system 101 is capable of finding a trajectory that is flyable to the destination submitted by the trajectory computation system, then the trajectory is programmed into the trajectory computation system and is followed to take the aircraft 100 to that destination. Otherwise, the trajectory computation system submits to the ATG system 101 the next destination in the ordered list.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating a trajectory to bring an aircraft in flight from an initial position of the aircraft to a destination having a georeferenced position, the method being implemented by an automatic trajectory generation system formed as electronic circuitry embedded in the aircraft, the method comprising the following steps:
    obtaining polygons representative of obstacles potentially encountered by the aircraft from the initial position of the aircraft to the destination, each polygon being associated with an altitude layer in which the obstacle is included in said polygon;
    identifying vertices associated with the polygons, each vertex located at a concave part of a polygon;
    searching for a lateral trajectory that is flyable between the initial position of the aircraft and the destination by circumventing the polygons by the vertices, by observing a pre-established vertical trajectory profile;
    the lateral trajectory being sought as follows:
        evaluating first trajectories, which are direct trajectories between a current position of the aircraft and the destination by taking account of a direction of flight of the aircraft at the current position and a direction to be followed to the destination, the current position of the aircraft being initially the initial position of the aircraft, and identifying any polygon encountered in the first trajectories;
        evaluating a second trajectory, which is a vertex-circumventing trajectory, between said current position of the aircraft and each identified polygon vertex;
        identifying any new polygon encountered in the second trajectories;
        choosing a new current position of the aircraft from among the identified polygon vertices for each of which a direct flyable trajectory to the vertex concerned exists, and reiterating until a current position of the aircraft is found for which at least one first trajectory exists without encountering a polygon;
    the lateral trajectory being further sought in such a way that, when a new polygon is identified, one second trajectory is evaluated for each vertex of each new identified polygon, and this is done, with respect to each preceding current position, with a possible identification of a new encountered polygon.

2. The method according to claim 1, wherein the lateral trajectory is sought, by iterations on successive current positions of the aircraft, for:
    a first phase investigating the direct trajectory between the current position of the aircraft which has been selected for a particular iteration and the destination, and investigating possible circumventions of vertices from the current position of the aircraft which has been selected for the iteration concerned;
    a second phase investigating possible circumventions of vertices, for the polygons identified during the iteration concerned, from each preceding current position.

3. The method according to claim 2,
    wherein, when a polygon is newly encountered, each of its vertices for which a direct flyable trajectory to this vertex exists is marked as an open position, and
    wherein, in the first phase, the current position which has been selected for the particular iteration concerned is marked as closed position, and in the second phase, the positions marked as closed are the preceding current positions.

4. The method according to claim 3, wherein the new current position is chosen from among the positions marked as open.

5. The method according to claim 1, wherein each identified polygon vertex for which a direct flyable trajectory to this vertex exists is associated with a heuristic, or with a cost of inclusion of a circumvention of said vertex in the lateral trajectory to the destination, in order to choose the current new position from among the identified polygon vertices.

6. The method according to claim 1, further comprising the following successive steps, before searching for the lateral trajectory:
- expanding the polygons by a predetermined lateral margin in all directions, the predetermined lateral margin making it possible to ensure safe instrument navigation of the aircraft;
- merging the polygons which touch or overlap for each altitude layer;
- retracting the polygons by the predetermined lateral margin in all directions.

7. The method according to claim 1, comprising the following step, before searching for the lateral trajectory:
- keeping only the polygons of the layers which are relevant with respect to a constant altitude or an altitude interval defined by the vertical trajectory profile.

8. A computer including a non-transitory memory containing a computer program comprising instructions causing an implementation of the method according to claim 1, when the instructions are executed by a processor.

9. An automatic trajectory generation system for bringing an aircraft in flight from an initial position of the aircraft to a destination having a georeferenced position, the automatic trajectory generation system comprising electronic circuitry which is configured to be embedded in the aircraft and which is configured to implement the following steps:
- obtaining polygons representative of obstacles potentially encountered by the aircraft from the initial position of the aircraft to the destination, each polygon being associated with an altitude layer in which the obstacle is included in said polygon;
- identifying vertices associated with the polygons, each vertex located at a concave part of a polygon;
- searching for a flyable lateral trajectory between a current position of the aircraft and the destination by circumventing the polygon by the vertices, by observing a pre-established vertical trajectory profile;

the lateral trajectory being sought as follows:
- evaluating first trajectories, which are direct trajectories between the current position of the aircraft and the destination by taking account of a direction of flight of the aircraft at the current position and of a direction to be followed to the destination, the current position of the aircraft being initially the initial position of the aircraft, and identifying any polygon encountered in the first trajectories;
- evaluating a second trajectory, which is a vertex-circumventing trajectory, between said current position of the aircraft and each identified polygon vertex;
- identifying any new polygon encountered in the second trajectories;
- choosing a new current position of the aircraft from among the identified polygon vertices for each of which a direct flyable trajectory to the vertex concerned exists, and reiterating until a current position of the aircraft is found for which at least one first trajectory exists without encountering any polygon;

the lateral trajectory being further sought in such a way that, when a new polygon is identified, one second trajectory is evaluated for each vertex of each new identified polygon, and this is done, with respect to each preceding current position, with possible identification of a new encountered polygon.

10. An aircraft comprising the automatic trajectory generation system according to claim 9.

* * * * *